(No Model.) 8 Sheets—Sheet 1.
G. BOEMERMANN.
CASH REGISTER AND INDICATOR.
No. 456,133. Patented July 21, 1891.

WITNESSES:
INVENTOR:
George Boemermann,
By Henry Connett
Attorney.

(No Model.)
8 Sheets—Sheet 2.

G. BOEMERMANN.
CASH REGISTER AND INDICATOR.

No. 456,133. Patented July 21, 1891.

WITNESSES:
John A. Rennie

INVENTOR:
George Boemermann,
By Henry Connett
Attorney.

(No Model.) 8 Sheets—Sheet 3.
G. BOEMERMANN.
CASH REGISTER AND INDICATOR.

No. 456,133. Patented July 21, 1891.

(No Model.) 8 Sheets—Sheet 5.
G. BOEMERMANN.
CASH REGISTER AND INDICATOR.

No. 456,133. Patented July 21, 1891.

WITNESSES:

INVENTOR:
George Boemermann
By Henry Connett
Attorney.

(No Model.)

8 Sheets—Sheet 6.

G. BOEMERMANN.
CASH REGISTER AND INDICATOR.

No. 456,133. Patented July 21, 1891.

WITNESSES:

INVENTOR:
George Boemermann,
By Henry Connett
Attorney.

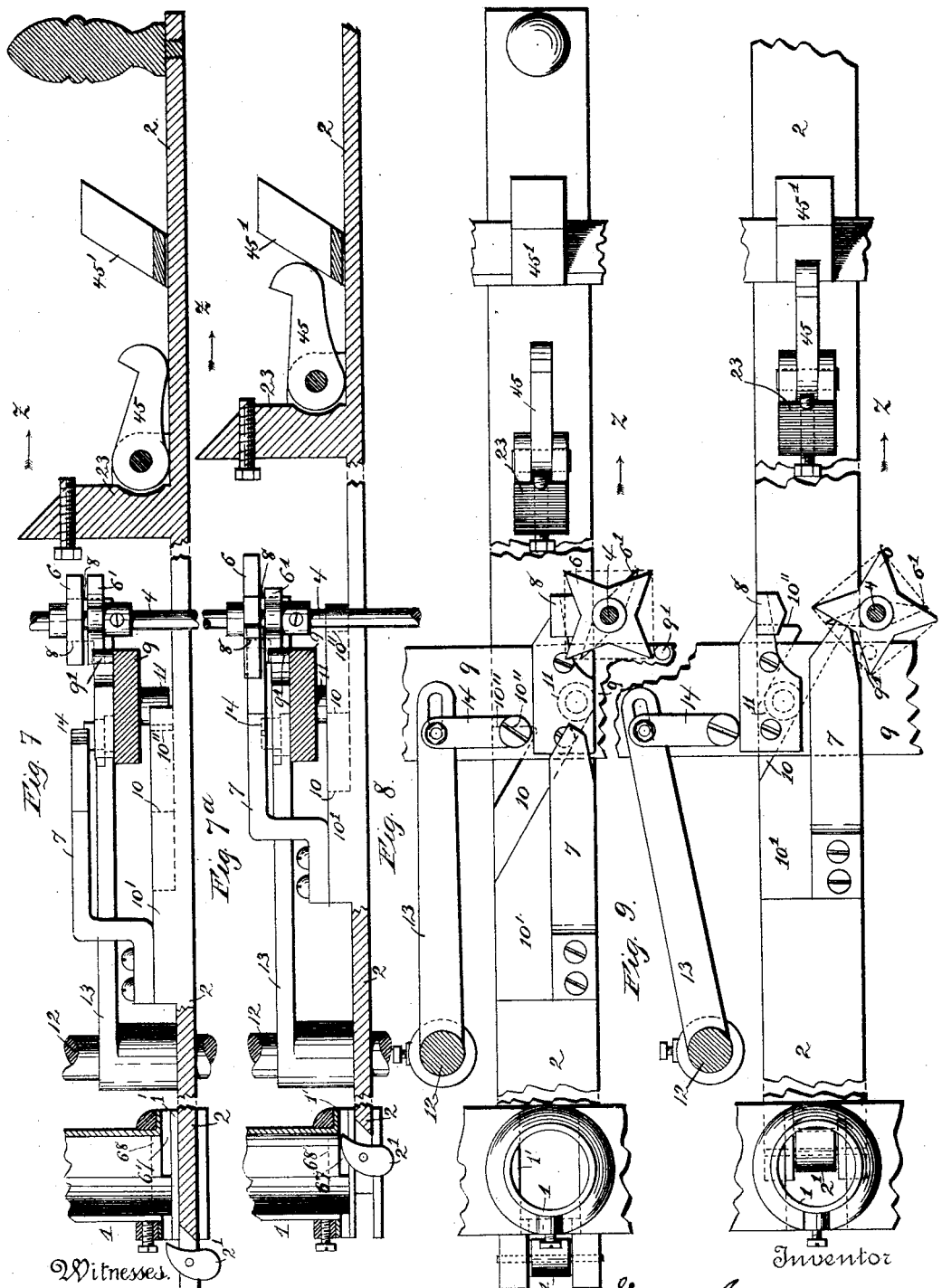

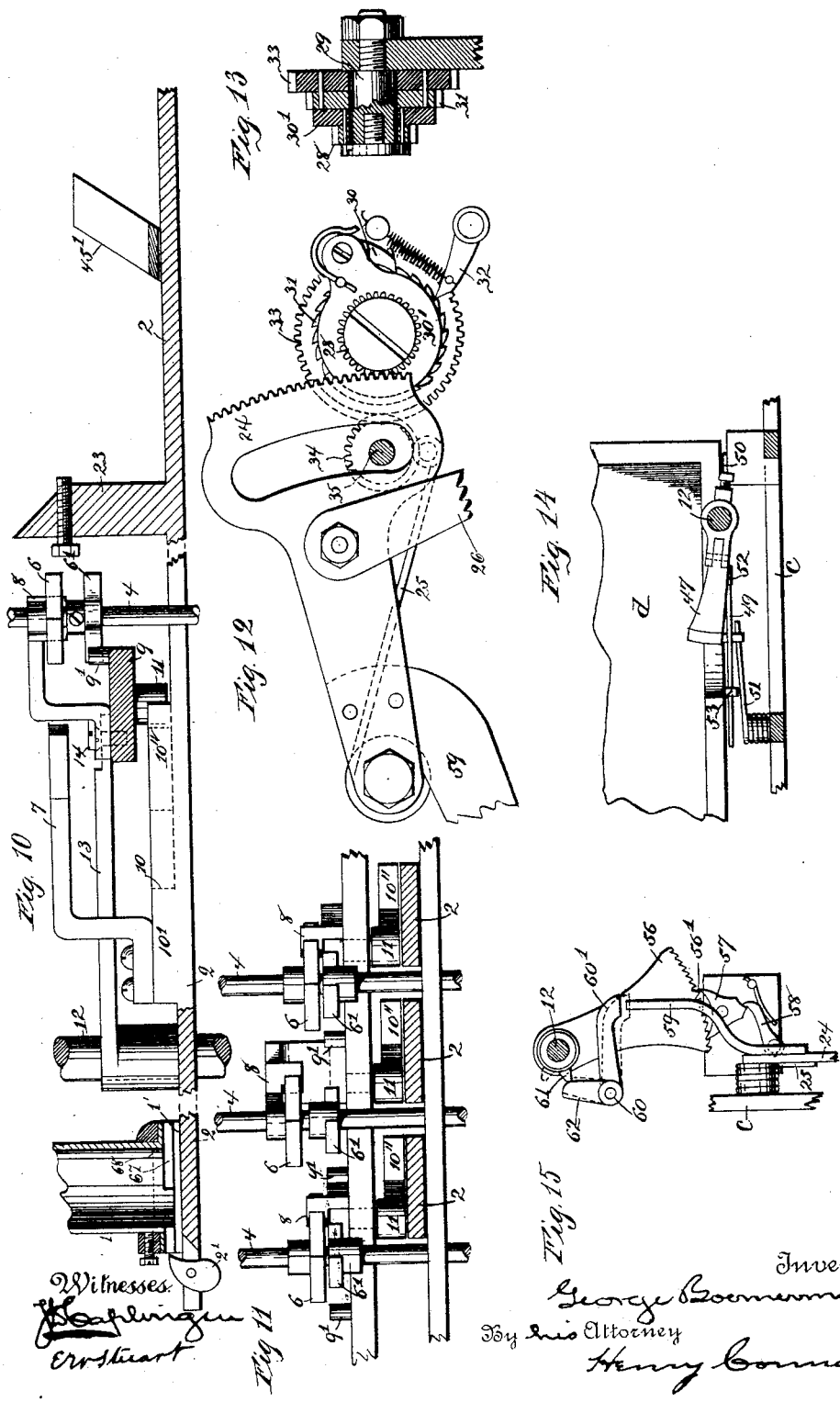

UNITED STATES PATENT OFFICE.

GEORGE BOEMERMANN, OF BROOKLYN, NEW YORK.

CASH REGISTER AND INDICATOR.

SPECIFICATION forming part of Letters Patent No. 456,133, dated July 21, 1891.

Application filed March 28, 1890. Serial No. 345,692. (No model.)

*To all whom it may concern:*

Be it known that I, GEORGE BOEMERMANN, a citizen of the United States, residing in Brooklyn, Kings county, New York, have invented certain Improvements in Cash-Counters, of which the following is a specification.

My invention relates to that class of cash-counters such as are employed in bar-rooms and the like for adding up the cash received by the bar-tender. In this class of devices it is common to employ "pulls," each of which corresponds with a sum of money, as five cents, ten cents, fifteen cents, &c., and to employ devices connected with such pulls, whereby when one of them is actuated a gong is sounded, a numeral corresponding to the pull is turned into view, a check is drawn from a check-holder and delivered or deposited, a cash-drawer is unlocked and pushed out, and the sum received is added up by a suitable counter and register.

My present invention embodies mechanisms for effecting all of these results and others that will be hereinafter described.

In the accompanying drawings I have shown my invention embodied in an apparatus having the pulls arranged in several tiers, the lower tier including only what I call "dollar-pulls" for use in adding up at once sums of one or more dollars, and pulls for registering the sale of "pints" or "quarts" of beer or ale.

Figure 1:
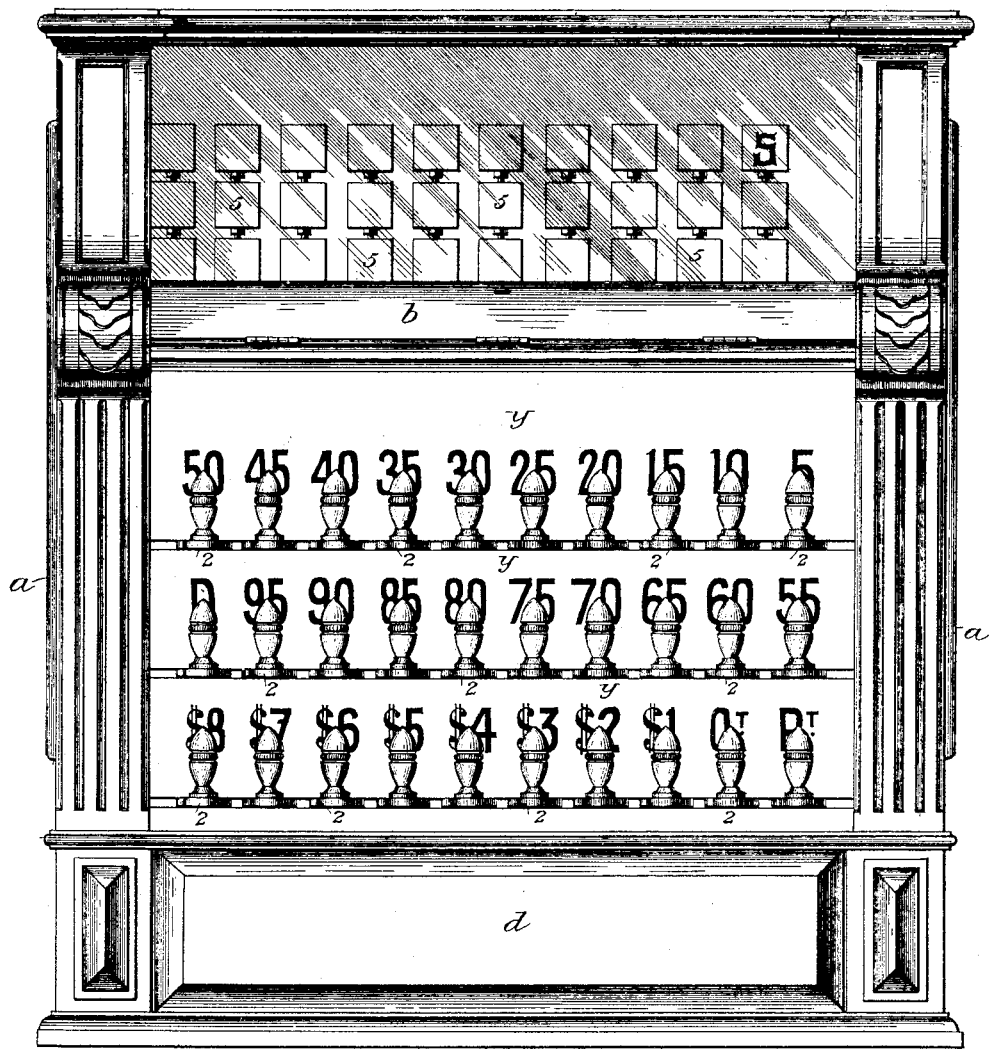
Figure 2:
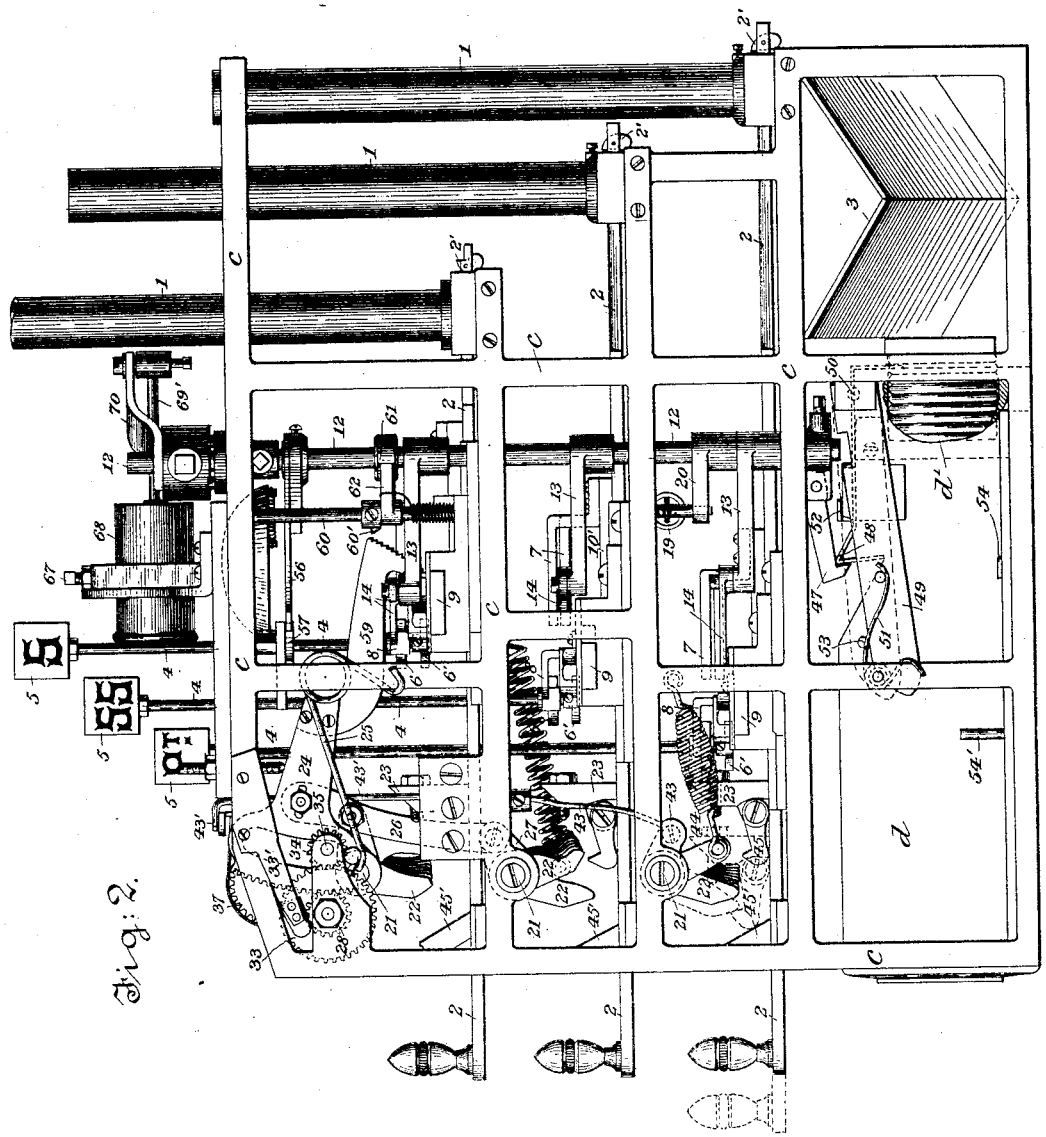
Figure 3:
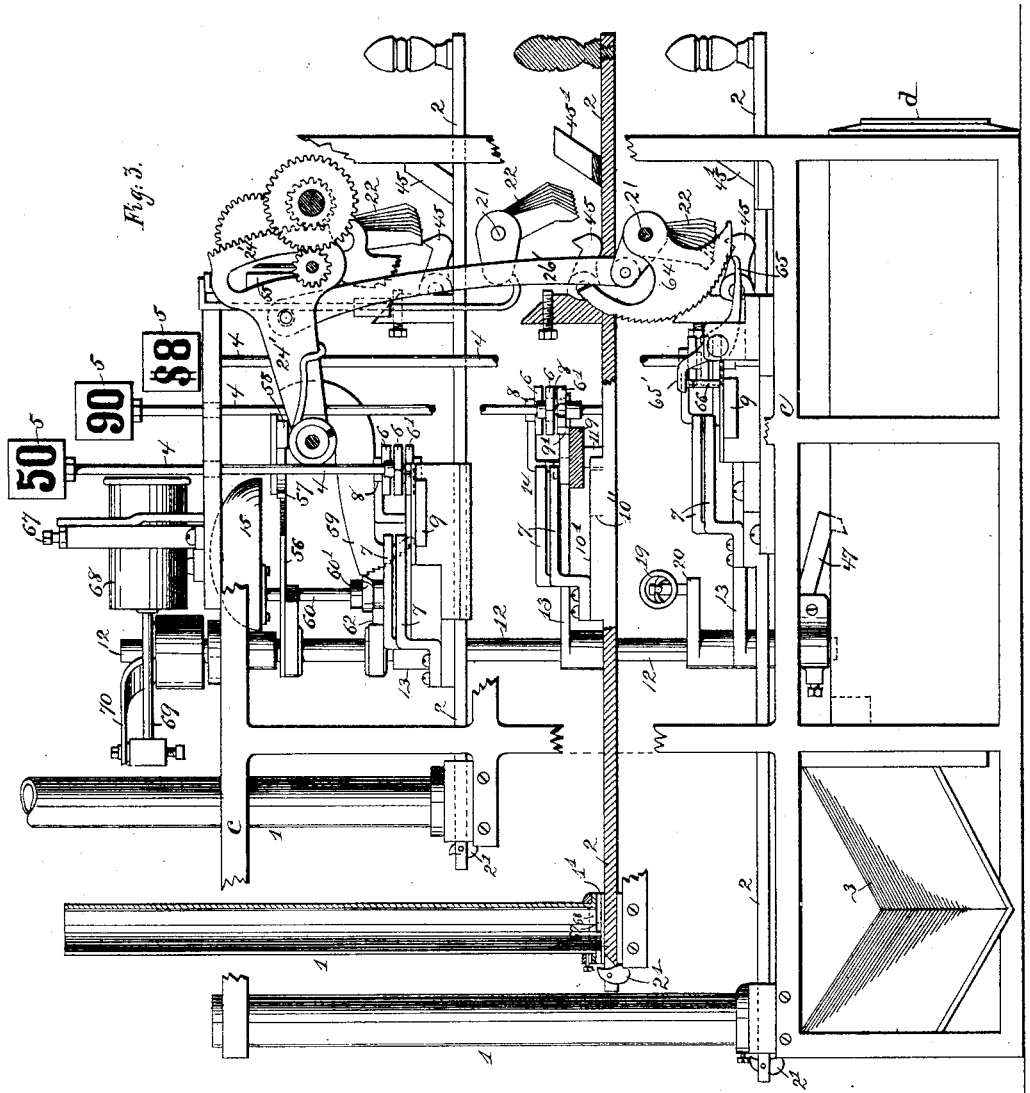
Figure 4:
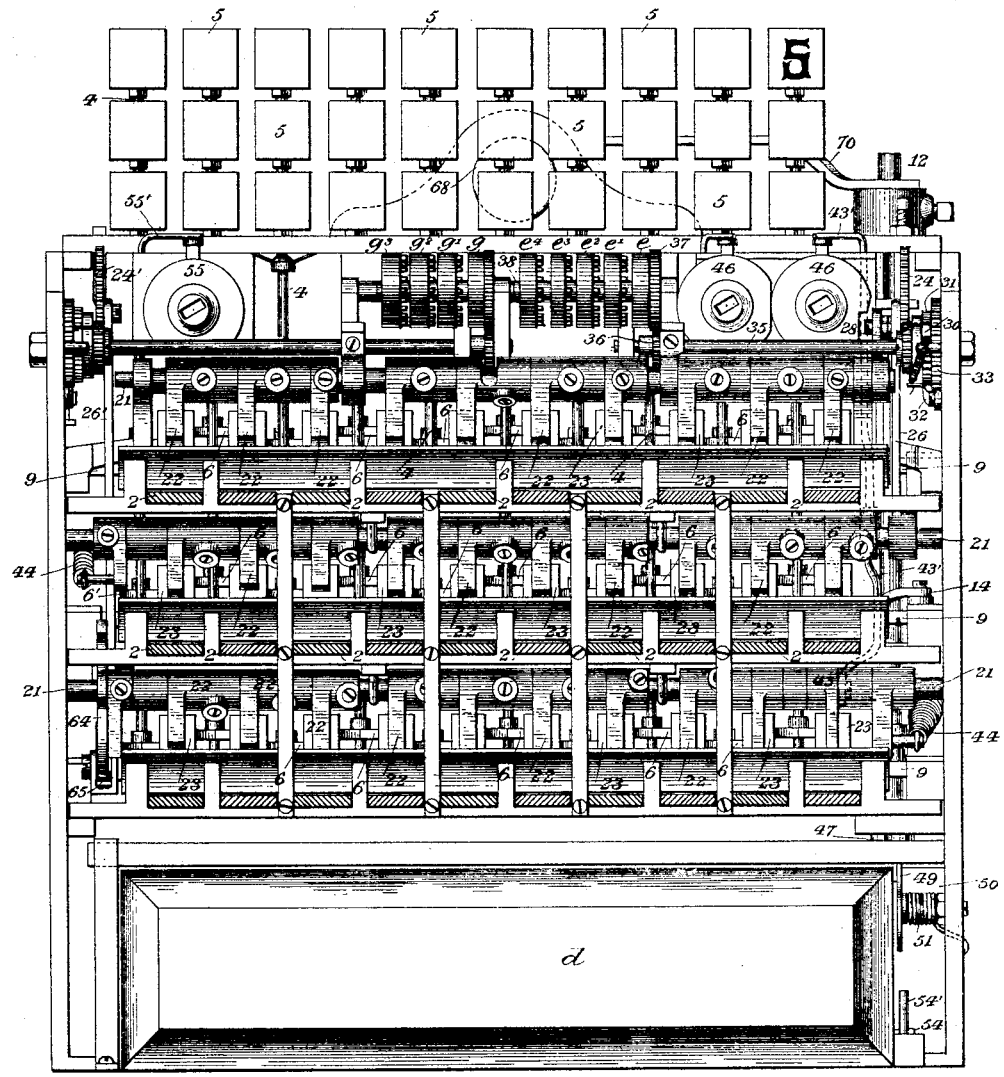
Figure 5:
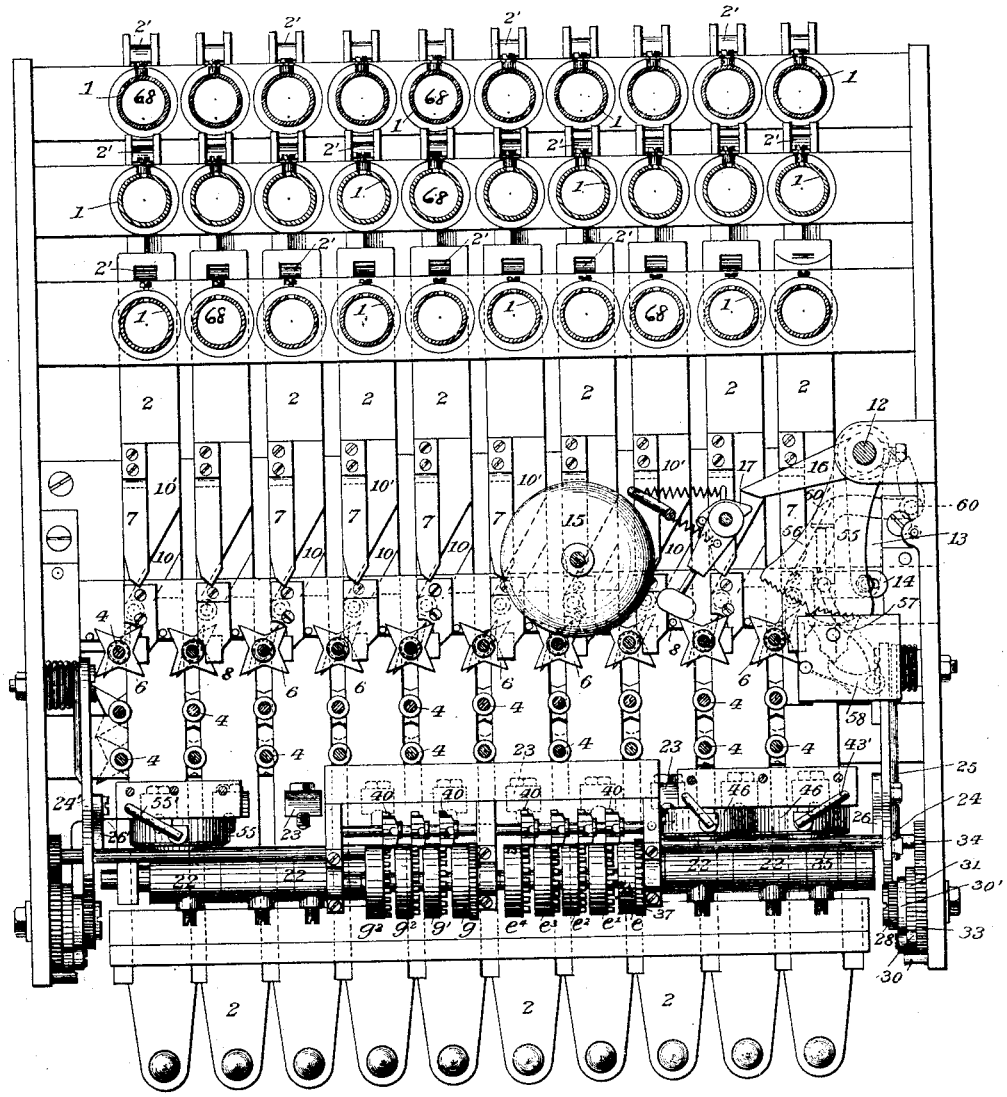
Figure 6:
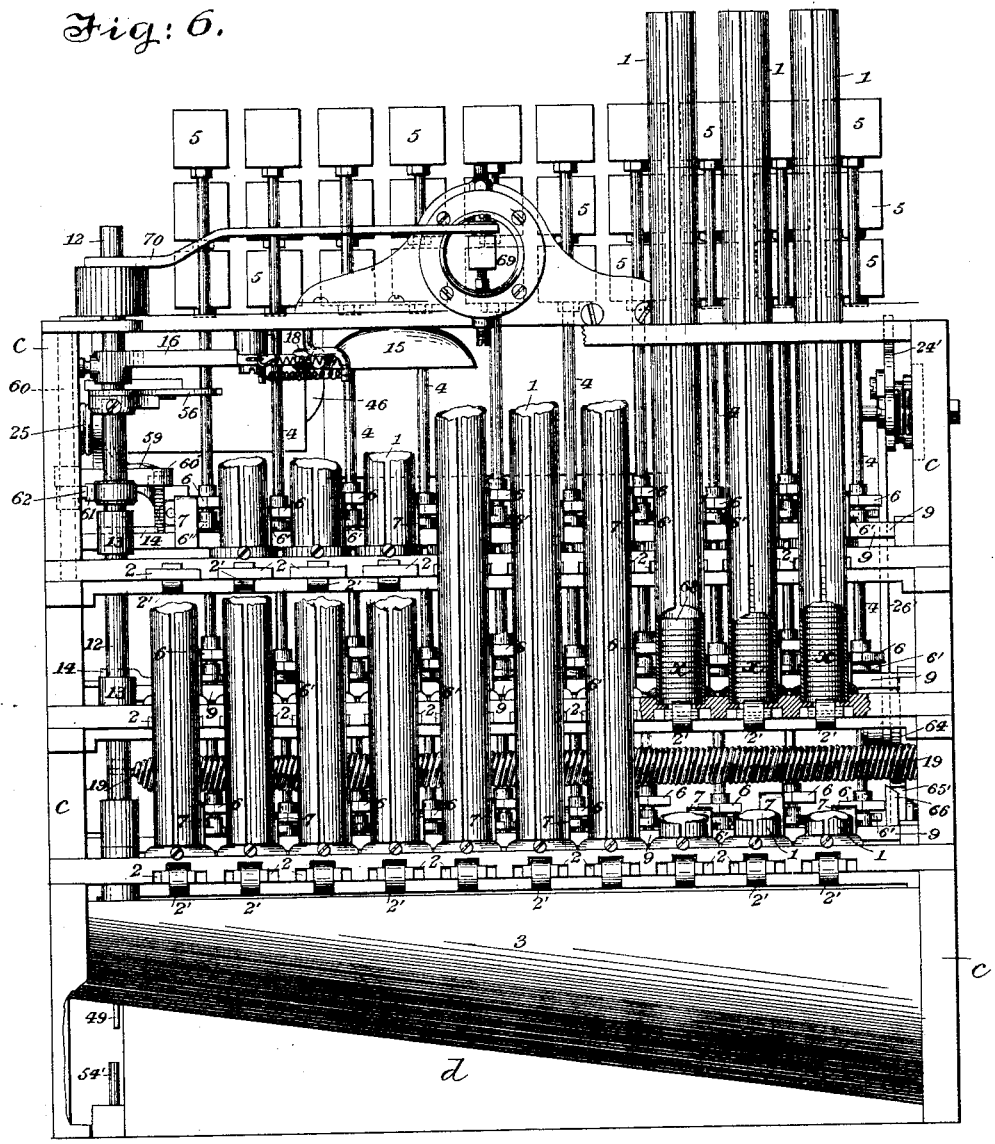

Figure 1 of the drawings is a front elevation of the counter or apparatus in its casing. Fig. 2 is an elevation of the right-hand side of the counter with its casing removed. Fig. 3 is a sectional elevation of the counter seen from the left-hand side. Fig. 4 is substantially a front elevation of the counter with the casing removed. The pulls only are in section in this view. Fig. 5 is substantially a plan view of the counter with its casing removed. The cross-bars at the top of the frame and the numeral-bearing cubes or blocks are removed also, the spindles of the latter being in section. Fig. 6 is substantially a rear elevation of the counter with the casing removed, some of the check-holders or tubes being broken away at their lower ends to show their construction. Figs. 7, 7ª, 8, 9, 10, and 11 are detached detail views of the pull and of the mechanism for actuating the numeral-bearing blocks. Figs. 12 and 13 are detached detail views of the adding mechanisms. All of the above detail views are on a scale about double that of the principal figures. Fig. 14 is a detached plan view of the drawer-locking mechanism. Fig. 15 is a detached detail view of a device that will be hereinafter described.

I will describe the apparatus as illustrated in the drawings, premising that the construction shown therein may be varied to some extent without departing materially from my invention.

*a* represents a suitable outer casing for inclosing the operative mechanism. This casing may be mainly of wood and glass, and will be provided with a locked flap or door *b* to enable any authorized person to examine the adder or adding-device at any time to ascertain the sum received. Within the outer casing *a* is an inner metal frame *c* to form bearings for the operating mechanism.

As the mechanism of the apparatus is mainly composed of a number of substantially like elements, I will not describe each of these elements minutely, but will describe the whole generally and point out how they are dependently controlled and connected.

1 are tubular check-holders set upright in the frame *c* at the back of the apparatus. These holders are filled with checks *x* at their open upper ends. Access may be had to these check-holders for filling them through a suitable door in the top of the casing *a*. Through the bottom of each holder 1 plays the rear inner end of a pull 2. I will say here that these pulls 2 and check-holders 1 are arranged in three tiers, as here shown, in order to economize space. Each pull 2 corresponds to a particular sum or amount, those of the upper tier corresponding, respectively, to the sums five cents, ten cents, &c., to fifty cents; those of the middle tier corresponding, respectively, to the sums fifty-five cents, sixty cents, &c., to ninety-five cents. The numerals are marked on the front plate *y* of casing *a* over the respective pulls. The pull at the left-hand end of the middle tier is marked "D," which signifies "dummy," the purpose of which pull will be hereinafter explained. In the lower tier the two pulls at the right are marked, respectively, "P't" and "Q't." These are for the purpose of counting the number, respectively, of pints and quarts of beer or ale sold. The remaining pulls in the lower tier are to assist in counting the larger sums received, as one dollar, two dollars, &c., to eight dollars.

Suppose that the bar-tender or salesman has made a sale and receives five cents. He turns to the apparatus, draws out the right-hand pull 2 of the upper tier, which is marked "5" on plate, $y$ and pushes it in again. This operation of the pull produces several effects—namely, it removes the bottom check from the check-holder 1 corresponding to this pull and allows said check to fall in the chute 3 below; it rotates one of a series of upright spindles 4, on which are fixed the respective numeral-bearing blocks or cubes 5, turning said block a quarter-way round and exposing the face thereof on which is marked the numeral "5;" it actuates the counter or adding mechanism, adding five to the sum indicated thereby; it sounds a gong; it unlocks the cash-drawer and allows it to be pushed out, and it locks all the other pulls in such a manner that neither of them can be drawn out until it is pushed in again.

In order to take the weight of the pile of checks $x$ off from that portion of the pull 2 which plays through the check-holder 1, I provide the holder with a ledge 1', (seen best in Fig. 6 and in the enlarged detail views, Figs. 7, 8, and 9,) for the checks to rest on, and I provide the pull 2 with a gravity dog or latch 2', pivotally mounted in its extreme end to push out the bottom check of the pile when the pull is actuated. In the middle and lower tiers of pulls the dog 2' is so mounted that it removes the check when the pull is drawn out, and when the pull is pushed in the said dog tilts on its pivot and moves back under the pile of checks without disturbing them; but to economize space I reverse the position of the dog in the upper tier, whereby it expels the check when the pull is pushed in. These dogs or latches 2' may all be set to operate in either way described.

I will now describe the means whereby the spindle 4 is rotated axially in such a way as to expose the numeral on the block 5, mounted on its upper extremity.

The spindle 4 has a bearing in the frame $c$, and has fixed on it a star-wheel or verge-wheel 6, with four teeth or points, and on the upper face of the pull 2 is fixed a piece, which I call, for convenience, a "pallet" 7. When the pull is drawn out, the front end of this pallet strikes a point on said wheel 6 and rotates said wheel about one-eighth of a revolution, and when the pull is pushed in another pallet 8 on a transverse slide or slide-bar 9 strikes the point on the wheel and rotates the latter to the same extent as the pallet 7—that is to say, the two pallets impart a quarter-turn to the spindle 4, and thus turn the block 5, so as to expose the face thereof bearing the numeral. As the spindle turns continuously in one direction and makes a quarter-turn at each operation of the pull, it is necessary to mark the numeral, as 5, on the opposite sides of the square block 5, the other two sides being blank. The mechanism just described is sufficient for turning the numeral bearing-face of a block 5 to the front when the pull which actuates that block is operated; but it is essential that this block shall receive a quarter-turn, so as to bring one of its blank faces to the front when any other pull is next drawn out, and also essential that when the same pull is drawn out several times in succession it will always exhibit the numeral-bearing face of the block 5— that is, if the blank face of said block be exposed when the pull is drawn out, the block will always be turned a quarter-way round; but if the numeral-bearing face be exposed the block will always be turned a half-way round. I will now explain the mechanism for operating the slide-bar 9, whereby it is caused to move transversely of the path of the pull 2 when the latter is drawn out. This bar extends transversely of the apparatus and plays in guides over all the pulls in a tier, the pulls being arranged side by side and parallel with one another. In the upper face of the several pulls 2 is an oblique groove 10, formed in a plate on a raised portion of the pull. On the lower face of the bar 9, one over each pull, are fixed downwardly-projecting studs 11, adapted to enter the respective grooves 10 in the pulls when the latter are drawn out. The advanced or front end of the raised portion 10' of the pull, where the mouth of the groove 10 is situated, stands just back of the rear sides of the series of studs 11. Consequently when a pull 2 is drawn out the oblique groove 10 is made to engage the stud 11 in its path, and the oblique side of said groove, acting on said stud, imparts an endwise movement to the bar 9, and when the pull is again pushed in or "home" the other oblique side of said groove acts on the stud to return said bar to its first or normal position. The pallet 8 on the bar 9 is thus moved, first from the verge-wheel 6, so as to permit the pallet 7 to partially rotate the same, and then to move up to and complete the partial rotation of said wheel, as before explained. In order to lock the wheel fast and prevent accidental rotation thereof, the face of the pallet 8 is made V-shaped, so as to fit approximately into the space between two adjacent points or teeth of the verge-wheel.

It may be well to explain here that when a pull 2 has been drawn out and the sliding bar 9 has been displaced longitudinally thereby, as described, it will be impossible to draw out any other pull in that tier until the one drawn out shall have been again pushed in. This will be readily understood when it is seen that the longitudinal or endwise movement of the bar 9 displaces the studs 11 until they no longer stand opposite to the mouths of their respective grooves 10, but opposite to and in front of the solid shoulders 10'', formed by the front ends of the respective raised portions 10' on the pulls. It may also be explained that each tier of pulls is provided with a sliding bar 9, and that these are so connected that they all move in unison, and hence the drawing out of one pull locks all the other pulls in the several tiers.

Having now explained how the bar 9 is actuated by the pull 2, I will proceed to describe the mechanism whereby the essential movements of the block 5, which have been before referred to, are effected, attention being called especially to the several detail views, Figs. 7 to 9, for illustration. Figs. 7 and 7ª are sectional elevations of a pull and adjacent mechanisms, showing the moving parts in different positions, and Figs. 8 and 9 are respectively plan views of the mechanisms as seen in Figs. 7 and 7ª.

On the spindles 4 of the numeral-bearing blocks 5 below the four-toothed verge-wheel 6 is secured a verge 6', having two oppositely-arranged teeth, as shown in Figs. 7 to 9, and also in Figs. 10 and 11. In the upper face of the bar 9 is fixed a stud 9', which is designed to impart a partial rotation to the spindle 4 under certain conditions. For example, Figs. 7 and 8 represent the normal position of the parts, the pull 2 being pushed home and the block 5 (represented in these views by the square dotted lines) exhibiting one of its blank faces to the front—that is, toward the arrow Z in the several Figs. 7 to 9. When the pull 2 is drawn out, the pallet 7 advances and the pallet 8 withdraws; and when the pull is fully drawn out the parts will have assumed the position seen in Fig. 9. When the pull is pushed home again, the pallet 7 will withdraw and the pallet 8 will move up to the wheel 6 and complete the quarter-rotation of the said wheel. One of the numeral-bearing faces of the block 5 will now be turned to the front—i. e., toward the arrow Z; but one tooth of the two-toothed verge 6' will now stand in the path of the stud 9' on the bar 9. Now if some other pull be drawn out this pull will stand stationary; but the bar 9 will be displaced, as usual, and the effect will be to cause the pallet 8 to withdraw and the stud 9' to move up to and act on the adjacent point of the verge 6', and thus to impart to the block 5 a quarter-turn, thereby turning one of its blank faces to the front. The parts will now stand as represented in Fig. 7; but after the pull 2 has been drawn out and pushed in and the parts are left standing, as described, with a numeral on block 5 presented to the front, if this pull be again drawn out and pushed home the effect will be to impart to the block 5 a half-turn and to bring the numeral-bearing face opposite that last presented to the front. When the pull is drawn out the second time, the stud 9' acts on the point of the verge 6' and turns the block a quarter-way round, and the pallets 7 and 8 turn it another quarter, thus completing the half-turn. By this mechanism the proper presentation of the faces on the blocks 5 is assured. The pallets 7 and 8 and the verge-wheel 6, upon which they act, will of course be in the same horizontal plane, and the verge 6' and stud 9', which acts upon it, will also be in the same plane; but owing to lack of room in the apparatus the pulls are placed close together side by side, and if all the mechanisms were in the same plane there would not be room for them to operate. Hence the verge-wheels 6 on some of the spindles 4 are raised above the level of the others, and the pallets 7 and 8, which act on them, are correspondingly raised. This is illustrated in Figs. 10 and 11, wherein Fig. 10 is a side view and Fig. 11 is a front elevation of these parts of the mechanism, showing three pulls and their appurtenances, the pulls being in transverse section.

The mechanism whereby the slide-bars 9 of the three tiers of pulls are coupled operatively together comprises an upright rock-shaft 12, provided with three arms 13 13 13, which are coupled by links 14 14 14 to the respective sliding bars 9 9 9 of the several tiers of pulls. Consequently when one bar 9 is displaced it rocks the shaft 12, and through it displaces the bars 9 of the other tiers.

The gong or bell 15 is sounded through the medium of the shaft 12. On this shaft is fixed an arm 16, beveled at its free end, and when a pull 2 is drawn out and the shaft thereby rocked this beveled arm wipes over a trip 17 on the arm of the bell-hammer 18. When the pull is pushed in, the arm 16 catches on the trip 17, draws back the hammer, and then passes the trip, thus permitting the spring-actuated hammer to strike the gong a smart blow.

When a pull 2 is pushed in, its movement is materially assisted and accelerated by a strong retracting-spring 19, attached at one end to an arm 20 on the rock-shaft 12 and at its other end to the frame c.

I will now describe the counting or adding mechanisms, with especial reference to Figs. 12 and 13. Fig. 12 is a side view, on a large scale, of the rack device for actuating the adding-wheels through the medium of the pulls; and Fig. 13 is a transverse section through the gears and ratchet-wheels seen in Fig. 12. The adding-wheels employed herein possess no particular novelty and will require no special description.

Before proceeding to describe the construction and operation of the counting and adding mechanisms I will state that there is one adding mechanism common to all the pulls in the upper and middle tiers, which add up the cents received, and another similar mechanism for the lower tier, which adds up the dollars, and in addition to these there are counters, which possess no special novelty in themselves, for counting and registering the numbers of quarts and pints sold. I will first describe the mechanism common to the upper and middle tiers.

On rock-shafts 21, which extend across the apparatus above the pulls 2 of these respective tiers, are fixed toes 22, which may be alike in form, but which are set out of line, as will be seen by inspection of Fig. 2. The reason for this will be explained. One of these toes is arranged over each pull 2, and on each pull is fixed an upright 23, which, when the pull is drawn fully out, strikes the toe 22 in its path, swings it forward, and thus rocks the shaft 21 to an extent corresponding to the extent of movement imparted to said toe. The extent to which the shaft 21 is rocked by the drawing out of any one of the several pulls is governed by the angle or respective position at which the toes 22 are set. For example, the pull 2, corresponding to the number "5" on plate $y$, (upper tier,) rocks the said shaft to the minimum extent, the pull corresponding to "95" (middle tier) rocks said shaft to the maximum extent, and the pulls corresponding to the intermediate numbers will rock the said shaft proportionately.

On the right-hand side of the apparatus is pivotally mounted a rack 24, which is normally upheld by a spring 25. (See Figs. 2 and 12.) A link 26 couples this rack to an arm 27, fixed on the rock-shaft 21 of the middle tier, and said link is also coupled to an arm 27' on the rock-shaft 21 of the upper tier. Consequently when any one of the toes 22 is struck by the upright 23 of the corresponding pull and the shaft 21 is rocked to the extent due to that pull, the rack 24 will be drawn down to a predetermined extent, and when the pull is again pushed in the rack will be again elevated to its normal position by the spring 25. The teeth on the rack 24 gear with those of a pinion 28, which turns on a stud 29, fixed in the frame $c$. Carried by this pinion is a pawl 30 on a pawl-carrier 30'. This pawl engages the teeth of a ratchet-wheel 31, which rotates on the same stud 29. Consequently when the rack is drawn down it rotates the pinion 28 and causes the pawl to ride over the teeth of the ratchet-wheel 31, the latter being meanwhile held by a detent-pawl 32, and when the spring 25 returns the rack to its normal position the pawl 30 turns the ratchet-wheel 31. This ratchet-wheel is fixed to a toothed wheel 33, which gears with a pinion 34, fixed on a transversely-arranged shaft 35. On this shaft is another pinion 36, (see Figs. 4 and 5,) which gears with teeth on the first or "cents" wheel $e$ of the series of adding-wheels seen in Fig. 4. These wheels turn loosely on a fixed shaft or rod 38, mounted in the frame of the apparatus. The edge or periphery of the cents-wheel $e$ is divided into twenty divisions and bears twenty numerals 05, 10, 15, &c., to 90, 95, 00, increasing by five. The other adding-wheels of the series—namely, the "dollars wheel" $e'$, the "tens-of-dollars wheel" $e^2$, the "hundreds-of-dollars wheel" $e^3$, and the "thousands-of-dollars wheel" $e^4$ are numbered alike.

In order that one complete rotation of an adding-wheel may be made to impart one-tenth of a rotation to the wheel of the next higher denomination, I employ a mechanism that I will now briefly describe with reference to Fig. 5, premising that the devices employed are old for this purpose.

On a rod or fixed shaft 39, arranged parallel to the shaft 38 and adjacent to the adding-wheels, are mounted four pinions 40, Fig. 5, each of which has eight teeth at one end and four at the other end. The eight teeth on the pinions gear at all times with the crown-teeth of the respective adding-wheels, of which teeth there are twenty on each wheel. On the other face of each adding-wheel are two short teeth with a deep space or notch between them. Two of the four teeth on the pinion bear on the periphery of the adding-wheel in such a manner as to lock said pinion against rotation until one of said teeth engages said notch, when the pinion is allowed to make a partial rotation.

The mechanism for adding the dollars, through the medium of the eight pulls at the left in the lower tier, is the same in substance as that just described, and a minute description thereof will not be required. The mechanism is clearly shown in the general views, Figs. 3 and 4. The four dollar-adding wheels $g\ g'\ g^2\ g^3$ (seen at the left in Fig. 4) are constructed and mounted in precisely the same way as wheels $e\ e'\ e^2\ e^3$, and are actuated by mechanism (seen in Fig. 3) which is the same as that illustrated in Figs. 2, 12, and 13. The link 26', which connects the operating-rack 24' with the rock-shaft bearing the toes, is the same as the link 26, already described. When the rock-shafts 21 have been rocked by the pulls, they will be returned to their normal position by the springs, which act on the racks 24 and 24'; but in order to insure the return of the rock-shafts of the middle and lower tiers, and to assist the said rack-springs, I prefer to provide these rock-shafts with separate auxiliary springs 44, which may be seen in Figs. 2 and 4. These springs are attached at one end to crank-arms on the respective rock-shafts and at the other end to the frame of the apparatus.

To steady the wheel 33 on the stud 29 and destroy its momentum, I prefer to apply to it a friction-brake. This is shown in Fig. 2, where 33' represents a leaf-spring secured to the frame and having a friction-pad at its free end which presses against the side of said wheel.

In order to limit the extent of movement of the pull 2 and the extent to which the toe 22 can be moved by the upright 23 on the pull, I provide the pulls each with a stop-latch 45, (see Figs. 2, 3, 7, and 8,) which, when the pull 2 is drawn out, strikes and rides up on an incline 45' on the frame $c$ and engages the toe that is being pushed forward at its back. The position of these parts when a pull is drawn out is shown in dotted lines in Fig. 2. When in this position the parts are locked.

In order to accurately adjust the movement or swing to be given to each toe 22 by the corresponding upright on the pull, I prefer to provide each of said uprights with a set-screw, the tip of which impinges on the toe. This set-screw is not, however, at all essential.

The two right-hand pulls of the lower tier, which serve to register or count the numbers of "pints" and "quarts" sold, are not connected in any way with the adding mechanisms already described. They have, however, each an upright 23, which acts on a toe 22, mounted loosely on the rock-shaft 21 of the lower tier. Each of these toes has an arm 43, (see Fig. 2,) to which is coupled an operating-rod 43', which extends up to and actuates a counter 46. (See Fig. 4.) The toes are retracted by the springs of the counters. As both of these pulls, marked, respectively, "P't" and "Q't," operate mechanisms for counting which are precisely alike, and as the counters are in themselves old and substantially the same as those shown in a patent granted to me for a cash-counter, No. 411,573, dated September 24, 1889, I have not deemed it necessary to describe them minutely herein.

Whenever a pull is drawn out it unlocks a cash-drawer $d$ in the apparatus, which is then pushed out by a spring $d'$. The mechanism for unlocking the drawer will now be described with special reference to Figs. 2 and 14.

No pull 2 can be drawn out without rocking the upright rock-shaft 12, and on the lower end of this shaft is pivoted a latch-hook 47, which when the drawer $d$ is pushed in home engages a shoulder 48 on the said drawer. The drawing out of any pull serves to rock said shaft 12 and swing the latch 47 out laterally, so as to free the drawer $d$ when the spring $d'$ protrudes it. When the pull is pushed in, the latch is again brought back in line with the shoulder 48, so that when the drawer is pushed in the latch will ride over and catch on said shoulder and retain the drawer. This is the position of the parts seen in Figs. 2 and 14. In order to prevent a second pull from being drawn out while the drawer is still protruded, I provide the device I will now describe.

A plate 49 is pivoted to the frame $c$ at 50, so that its front end may play up and down close to the side of the drawer. A spring 51 tends always to press this plate upward toward a stop 52 on the drawer, and a pin 53, which projects from the side of the drawer, holds said plate down when the drawer is pushed in, so that the latch 47 may swing out laterally over it. When the drawer is protruded, the pin 53 passes off from the plate 49 and the spring 51 presses it up under the latch. The pull being instantly pushed in home the latch returns and the plate rises to the stop 52 and in the path of the latch, whereby the latter cannot be swung out laterally again until the drawer is pushed in. When this is done, the pin 53 wipes over the beveled end of the plate 49 and again depresses it below the path of the latch. This latch is limited in its up and down movement about its pivot, and may be depressed by gravity, in a well-known way, so as to engage the shoulder 48 on the drawer. The drawer is limited in its movement by a suitable stop. In the drawings (see Fig. 2) the drawer is represented as provided with a projection 54, which engages a stud 54' on a part of the frame $c$ when the drawer is protruded.

It may sometimes be desirable to unlock the drawer to get at its contents without operating the adding mechanisms, and to effect this I employ a pull 2, before referred to, called a "dummy." This pull is seen at the left of the middle tier, and is marked "D" on the front plate $y$. It will only be necessary to say with respect to this pull that it operates in precisely the same way as the pint and quart pulls already described. The toe 22 corresponding to it and actuated by it turns loosely on the rock-shaft 21 of the middle tier and operates a counter 55 through the medium of an operating-rod 55'. The mechanism of this pull is best seen in Figs. 3 and 5. The counter 55 registers the number of times this pull is actuated.

It is important that when any pull 2 is pulled out or pushed in it shall be pulled wholly out and pushed wholly in, and to attain this end I employ the mechanism illustrated in the general views Figs. 2 and 6, and as detached in Fig. 15. This latter view is a plan seen from below. On the upright rock-shaft 12, which is rocked by the manipulation of each and every one of the pulls, is fixed a double ratchet 56—that is, a ratchet having two sets of oppositely-inclined teeth and a large tooth or tripper 56' at the middle between these two sets of teeth. On a part of the frame $c$ is pivotally mounted a double pawl 57, the two beaks of which are adapted to engage the respective sets of teeth on the ratchet 56; but only one beak at a time can be in engagement. This is effected by a spring shifting-dog 58, which presses on the angular back of the double pawl. The position of the parts represented in Fig. 15 is the normal position when the pull is pushed home. The operation is as follows: When a pull is drawn out, the double ratchet moves in the direction of the arrow in Fig. 15, the engaged beak of the pawl 57 riding over the teeth of that set on the ratchet and the shifting-dog 58 holding it up to the rack. When the pull is drawn full out, the large tooth or tripper 56' will have moved far enough to take under the engaged beak of the pawl and lift it out of engagement. This causes the dog 58 to pass the apex of the angle at the back of pawl 57 and to press the other beak of said pawl into engagement with the other set of teeth of the ratchet 56. It will be seen by inspection that the pull must be moved far enough to trip the double pawl 57 before said pull can be moved in the opposite direction.

It may be possible, owing to a little looseness or lost motion in the pulls when drawn out, to move them in and out enough to actuate the adding mechanism. As a precautionary device to prevent this, I prefer to employ devices, which I will now describe, which serve to lock the operating-rack 24 or 24', as the case may be, when depressed, in such a manner that it shall remain locked in its depressed position until the pull which has depressed it shall have been pushed in home. I will first describe the device for this purpose that operates in connection with the upper and middle tiers and which is illustrated in Figs. 2, 6, and 15.

On the rack 26 is secured a curved ratchet 59. This ratchet is formed for convenience on a plate secured rigidly to the rack and which extends back of the pivot-point of said rack to a point adjacent to the upright rock-shaft 12. On an upright spindle 60 in the frame c is fixed a pawl 60', which is adapted to engage the teeth of ratchet 59, but is held out of engagement therewith by a stud 61 on the shaft 12, which impinges normally on a toe 62 on the spindle 60. Now when a pull is drawn out the first movement of the rock-shaft 12 withdraws the stud 61 thereon from under the toe 62 and allows a spring 63 about the spindle 60 to put the pawl 60' into engagement with the ratchet. The rack 26 may now be depressed, and the pawl 60' will hold it depressed until the pull is pushed home, when the stud 61 will again take under the toe 62 and lift or move the pawl 60' out of engagement with the ratchet. The rack 26 will now be free, and its spring will instantly return it to its normal position. By this device the adding mechanism is held positively against operation until the pull shall have been pushed home. The mechanism for locking in a similar manner the adding mechanism actuated by the pulls of the lower tier, called the "dollar pulls," is illustrated in Figs. 3 and 6.

On the rock-shaft 21 of the lower tier is secured a curved ratchet 64, adapted to be engaged by a spring-pawl 65, pivoted on the frame c. This pawl has a tail 65', which overhangs the slide-bar 9 of the lower tier, and on the said slide is a beveled lifter 66, which stands normally under the said tail of the pawl 65 and by elevating it depresses the pawl and holds it out of engagement with the ratchet. When a pull is drawn out, the bar 9 is displaced, and with it the lifter 66, and the pawl is put into engagement with the ratchet by its spring. The pawl holds the rack 24' depressed until the pull is pushed home, when the lifter 66 again raises the tail of the pawl and disengages the latter. The rack 24' is then elevated by its spring.

In order that the spring 19 shall not retract the parts too forcibly when a pull 2 is pushed in, I prefer to employ an air-cushion to relieve the shock. This cushioning I will now describe with reference to Figs. 2, 3, and 6.

On the top of frame c is mounted on vertical pivots 67 a cylinder 68, which is closed at the end presented toward the front of the apparatus. In this cylinder is fitted somewhat loosely a piston 69, the rod 69' of which is coupled to an arm 70, fixed to the top or upper end of the rock-shaft 12. When a pull is drawn out, the piston is pushed into the cylinder 68, and when said pull is pushed home the piston is again withdrawn. The resistance of the air to the movements of the piston serves to cushion the parts.

One of the advantages of my apparatus lies in the independence of the cents-pulls in the two upper tiers from the dollar-pulls of the lower tier in respect of the adding mechanisms. By reason of this construction the bartender may, if he receives a large amount—say five dollars and sixty-five cents—add the whole on the adding mechanisms by simply grasping with one hand the pull in the lower tier marked "$5," and the pull in the middle tier marked "65," and manipulating them both simultaneously. The drawer d will be protruded, no matter how many of the pulls may be drawn out simultaneously.

It is desirable to prevent the complete manipulation of a pull when the check-holding tube belonging to that pull is empty, in order that the amount registered by the adding mechanisms shall tally with the amount on the discharged checks. This may be done in various ways. In the accompanying drawings I have illustrated one simple means for detaining the pull when the checks are exhausted, and this I will now describe.

In Fig. 7, 67 represents the narrow transverse slot at the bottom of the tube 1, through which the check must pass when drawn out by the dog or latch 2' on the pull 2. This slot need only be wide enough vertically to allow the check to pass freely. When the checks x are placed in a tube, I place on top of the pile a disk or piece 68. (Seen in Fig. 6 and in dotted lines in Fig. 7.) This disk, which may be round, like the check, is too thick to pass out at the slot 67, and consequently when the last check shall have been drawn out this disk will drop down in the path of the latch 2', and as said disk cannot pass through the slot 67 it will serve as an obstacle to prevent that particular pull from being drawn out. The attendant will thus be warned at once and will remove said disk from the tube and recharge the latter with checks. The disk may be removed in any way preferred. It will suffice to attach a thread or string to it before it is put in the tube, so that it can be lifted out thereby.

If the tubes and pulls are so arranged that the checks are pushed out by latch 2', as shown in the upper tier in the drawings, the pull may be drawn out after the last check has been removed; but it cannot be pushed in again until the disk or piece 68 shall have been taken out.

I have shown a spring d' for protruding the drawer d when the latter is unlocked by the manipulation of a pull. This use of a spring is in itself an old idea, and I do not claim it in this application. The drawer may, however, be coupled by a link to an arm on the upright shaft 12, whereby it will be protruded when a pull is drawn out, and pushed in when the pull is pushed in, the pull in this case acting directly on the drawer to move it in and out.

The trough or chute 3, as herein shown, merely delivers the checks at one side of the frame c within the outer casing, or they may remain in part within said chute. This is not important.

Having now described my invention, I claim—

1. In a registering apparatus, the combination, with a horizontally-arranged series of like pulls 2, each provided with an oblique groove 10 and a shoulder 10″, of a slide-bar 9, arranged transversely of said pulls and provided with studs 11, adapted to engage said oblique grooves when the pulls are drawn out, whereby said bar is moved endwise, substantially as and for the purposes set forth.

2. In a registering apparatus, the combination, with two or more horizontally-arranged series of pulls 2, each pull provided with an oblique groove 10 and a shoulder 10″, of the transversely-arranged slide-bars 9, bearing studs 11, adapted to engage said oblique grooves when the pulls are drawn out, an upright rock-shaft 12, having arms coupled, respectively, to said slide-bars, and a spring 19 for retracting said shaft, whereby the drawing out of any of the pulls in the several series locks all the remaining pulls, as set forth.

3. In an apparatus for checking the receipt of money, the combination, with a pull 2, provided with a pivoted check-removing gravity-latch 2′, of the check-holder 1, through which the pull plays, provided with a ledge 1′, on which the bottom check rests, substantially as set forth.

4. In a registering apparatus, the combination, with the pull 2, provided with a pallet 7 and oblique groove 10, and the slide-bar 9, provided with studs 9′ and 11 and a pallet 8, of the upright spindle 4, carrying the numeral-bearing block 5 and having fixed thereon a four-pointed verge-wheel 6 in the plane of the pallets 7 and 8, and a two-pointed verge 6′, arranged in the plane of the stud 9′, said parts being arranged relatively and operating substantially as set forth.

5. In a registering apparatus, the combination, with a sliding pull 2, provided with an upright for actuating an adding-wheel when said pull is drawn out, of a rock-shaft 21, provided with a toe 22 in the path of the upright on the pull, a swinging rack 24, a link coupling said rack to an arm on rock-shaft 21, a spring which retracts said rack, an adding-wheel e, bearing numerals on its face, and intermediate mechanism or gearing, substantially as described, whereby the retraction of said rack rotates said adding-wheel.

6. In a registering apparatus, the combination, with a pull 2, provided with an upright 23, of a shaft arranged over said pull, a toe mounted to turn loosely about said shaft, said toe being in the path of the said upright on the pull, a counter 46, and the operating-rod 43′ of said counter coupled to an arm on said toe, whereby the operations of said pull are registered on said counter, as set forth.

7. In a registering apparatus, the combination, with the pull 2, a slide-bar actuated by the manipulation of said pull, and a rock-shaft 12, which is rocked through the medium of said slide-bar whenever a pull is manipulated, of means for compelling the pull to be drawn fully out and pushed fully in, said mechanism consisting of a double ratchet 56 on the said rock-shaft 12, provided with a tripper 56′, the double pawl 57, the beaks of which are adapted to engage alternately the respective teeth on said ratchet, and the shifting spring-dog 58, which bears on the back of said pawl, all arranged to operate substantially as set forth.

8. In a registering apparatus, the combination, with a pull 2, provided with a pivoted stop-latch 45 and an upright 23, and the frame in which said pull is mounted, provided with an incline 45′, arranged in the path of said latch, of the shaft 21 and the toe 22 on said shaft and depending in the path of the said upright, all arranged to operate substantially as set forth.

9. In an apparatus for checking the receipt of money, the combination, with the casing, the cash-drawer d therein provided with a shoulder 48 and a pin 53, and the spring which protrudes said drawer, of a pull 2, an upright rock-shaft 12, and intermediate mechanism whereby the manipulation of said pull rocks said shaft, a latch 47, carried by said rock-shaft and adapted to engage the shoulder on the cash-drawer and retain it when it is pushed in, a plate 49, pivoted to the frame at the side of the drawer, and a spring 51, arranged to elevate said plate when the drawer is protruded, the pin 53 being adapted to hold said plate depressed below the path of the latch 47 when the drawer is pushed in, substantially as set forth.

10. As a means for holding the rack 24 depressed until released by the pushing in of a pull, the combination of the ratchet 59 on said rack, the spindle 60, its spring 63, the pawl 60′, fixed on said spindle and adapted to be thrown into engagement with said ratchet by spring 63, the rock-shaft 12 and the toe 61 thereon, said toe being adapted to hold said pawl out of engagement with the ratchet until the shaft 12 is rocked, substantially as set forth.

11. As a means for holding the rack 24′ depressed until released by the pushing in of a pull, the combination of the curved ratchet 64 on the lower rock-shaft 21, the spring-pawl 65, adapted to engage said ratchet and provided with a tail 65′, and the lifter 66 on the lower slide-bar 9, arranged to take under the tail of said pawl and disengage it when the pull is pushed in, as set forth.

12. In an apparatus for checking the receipt of money, the combination of an adding mechanism for adding up the dollars that are received, an adding mechanism for adding up amounts under a dollar that are received, two sets of pulls and intermediate mechanisms for actuating the respective adding mechanisms, a cash-drawer, and intermediate mechanism whereby the cash-drawer will be protruded by the manipulation of any one or more of said pulls, substantially as set forth.

13. In a registering apparatus, the combination, with a check-holder 1, provided with a slot 67 for the passage of the checks, and a ledge 1' for the pile of checks to rest on, of the pull 2, which plays through said holder, the pivoted latch 2' on said pull and adapted to engage the bottom check of the pile when moved in one direction, the checks $x$, and the piece 68, which rests on the pile of checks in the holder, said piece having a thickness greater than the vertical width of the slot 67, whereby when the last check shall have been drawn out by the pull the latter will be locked, as set forth.

14. In an apparatus for checking the receipt of money, the combination of two horizontally-arranged tiers of pulls arranged at different levels, a slide-bar 9, extending transversely of each tier, an upright rock-shaft having arms to which are coupled the said slide-bars, and means, substantially as described, whereby the manipulation of any one of said pulls imparts an endwise movement to the slide-bar of the tier to which said pull belongs, substantially as set forth.

15. In an apparatus for checking the receipt of money, the combination of a pull 2, provided with a pallet 7, a slide-bar 9, provided with a pallet 8, an upright spindle 4, carrying a numeral-bearing block 5 and having fixed thereon a verge-wheel 6, arranged in the plane of said pallets, and means whereby the manipulation of said pull actuates said slide-bar, substantially as set forth.

16. In a cash-register, the combination of an adding mechanism for adding up the dollars that are received, an adding mechanism for adding up amounts under one dollar that are received, two sets of pulls and intermediate mechanisms for actuating the respective adding mechanisms, said pulls being adapted to be actuated both singly and simultaneously, and intermediate locking mechanisms which lock all the non-actuated pulls when any pull is drawn out, whereby the operator is enabled to simultaneously operate both of the adding mechanisms, as and for the purposes set forth.

In witness whereof I have hereunto signed my name in the presence of two subscribing witnesses.

GEORGE BOEMERMANN.

Witnesses:
 HENRY CONNETT,
 J. D. CAPLINGER.